UNITED STATES PATENT OFFICE.

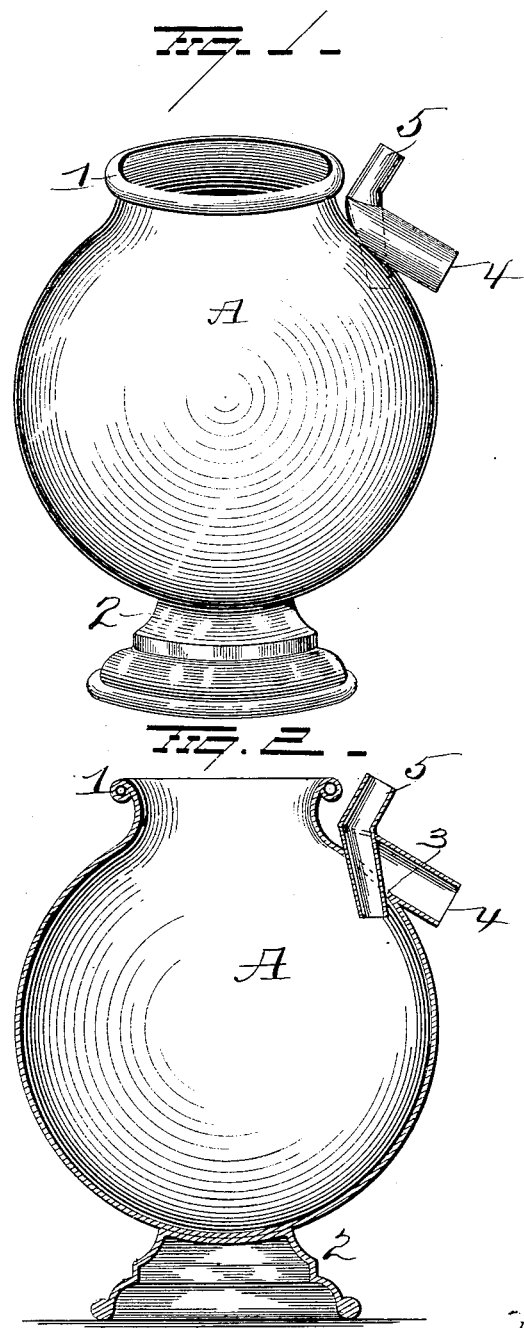

HENRY BURKE AND DAVID JAMES, OF CHICAGO, ILLINOIS.

PHOTOGRAPHIC-PRINT WASHER.

SPECIFICATION forming part of Letters Patent No. 653,766, dated July 17, 1900.

Application filed October 18, 1899. Serial No. 734,011. (No model.)

*To all whom it may concern:*

Be it known that we, HENRY BURKE and DAVID JAMES, residents of Chicago, in the county of Cook and State of Illinois, have invented certain new and useful Improvements in Print-Washers; and we do hereby declare the following to be a full, clear, and exact description of the invention, such as will enable others skilled in the art to which it appertains to make and use the same.

Our invention relates to an improvement in photographic-print washers, the object of the invention being to provide a print-washer adapted to receive a continuous flow of water under pressure to agitate the prints and wash the same.

With this object in view the invention consists in certain novel features of construction and combinations and arrangements of parts, as will be more fully hereinafter described, and pointed out in the claims.

In the accompanying drawings, Figure 1 is a perspective view illustrating our improvements, and Fig. 2 is a view in vertical transverse section of the same.

A represents an approximately-spherical body made, preferably, of zinc, having an opening in its top surrounded by a collar 1, and said body is provided with a conical base or support 2, secured to or integral with the body A.

The body A is provided near its upper end with an outlet-opening 3, with which a downwardly-projecting outlet-spout 4 communicates, and an inlet-spout 5 projects into the body A through the spout 4, extends across the outlet-opening 3, and terminates below said outlet-opening and is adapted to discharge the water downward against the inner face of the spherical body A to give the water and prints a whirling motion in the receptacle to effectually wash them. It will be seen that owing to the spherical shape of the body no projections will be encountered by the delicate prints to harm them in their process of washing. Owing to the near proximity of the inlet-spout to the outlet-opening, if a print should tend to escape through the outlet it will be encountered by the incoming stream of water and be driven away from the outlet and around the inside of the body.

The inlet-spout 5 may be connected with any approved water-supply by a flexible pipe, preferably rubber hose. (Not shown.)

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. In a print-washer, the combination with a spherical receptacle having a hole in its wall near its top, of a single structure comprising outlet and inlet spouts, the inlet-spout extending across one end of the outlet-spout, said single structure secured on the spherical structure with the inlet-spout projecting downwardly through the hole in the wall thereof and the outlet-spout communicating with said hole.

2. In a print-washer, the combination with a receptacle having a curved inner wall and an opening in said wall near the upper end of the receptacle, of a combined inlet and outlet device secured to the outside of the receptacle and consisting of two tubes disposed at an angle to each other, one of said tubes communicating with the opening in the wall of the receptacle and the other tube extending across said opening and arranged to discharge in a direction toward a point on said curved inner wall below the opening in the receptacle.

In testimony whereof we have signed this specification in the presence of two subscribing witnesses.

HENRY BURKE.
DAVID JAMES.

Witnesses:
WILLIAM RAILT JAMES,
HENRY JOSEPH WILLIAM EDWARDS.